(12) United States Patent
Hoetzeldt

(10) Patent No.: US 9,902,481 B2
(45) Date of Patent: Feb. 27, 2018

(54) AIRCRAFT INTERIOR EQUIPMENT COMPONENT AND AIRCRAFT INTERIOR EQUIPMENT COMPONENT SYSTEM

(75) Inventor: Stephan Hoetzeldt, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 563 days.

(21) Appl. No.: 13/641,996

(22) PCT Filed: Apr. 5, 2011

(86) PCT No.: PCT/EP2011/001689
§ 371 (c)(1),
(2), (4) Date: Nov. 28, 2012

(87) PCT Pub. No.: WO2011/131290
PCT Pub. Date: Oct. 27, 2011

(65) Prior Publication Data
US 2013/0087656 A1    Apr. 11, 2013

Related U.S. Application Data

(60) Provisional application No. 61/325,880, filed on Apr. 20, 2010.

(30) Foreign Application Priority Data

Apr. 20, 2010  (DE) .................. 10 2010 017 822

(51) Int. Cl.
*B64C 1/06*    (2006.01)
(52) U.S. Cl.
CPC .............. *B64C 1/061* (2013.01); *B64C 1/066* (2013.01); *Y10T 403/477* (2015.01); *Y10T 403/52* (2015.01); *Y10T 403/70* (2015.01); *Y10T 428/17* (2015.01)

(58) Field of Classification Search
CPC ....... B64C 1/061; B64C 1/066; Y10T 428/17; Y10T 403/52; Y10T 403/70; Y10T 403/477
USPC .............. 244/118.1, 119, 129.4, 129.1, 131; 296/39.1; 52/302.3, 506.08, 511
See application file for complete search history.

(56) References Cited

U.S. PATENT DOCUMENTS 3,096,601 A * 7/1963 Edmond ...................... 296/39.1
3,338,284 A * 8/1967 Ausnit ............................ 383/65
3,832,820 A * 9/1974 Eggert ...................... 52/506.08
3,980,196 A * 9/1976 Paulyson et al. .............. 220/1.5
(Continued)

FOREIGN PATENT DOCUMENTS

DE    43 40 002    5/1995
DE    199 16 838    11/2000
(Continued)

OTHER PUBLICATIONS

International Search Report for PCT/EP2011/001689, dated Jan. 26, 2012.

*Primary Examiner* — Valentina Xavier
(74) *Attorney, Agent, or Firm* — Nixon & Vanderhye P.C.

(57) ABSTRACT

An aircraft interior equipment component (10) with a frame (12) which comprises two rigid frame sections (14*a-h*) and a joint (16*a-h*) connecting the rigid frame sections (14*a-h*) to one another, and with a sheetlike section (18) which is supported by the frame (12) and is formed by a flexible and/or foldable membrane (20) connected to the frame (12).

25 Claims, 13 Drawing Sheets

(56) References Cited

U.S. PATENT DOCUMENTS

Figure 2A:
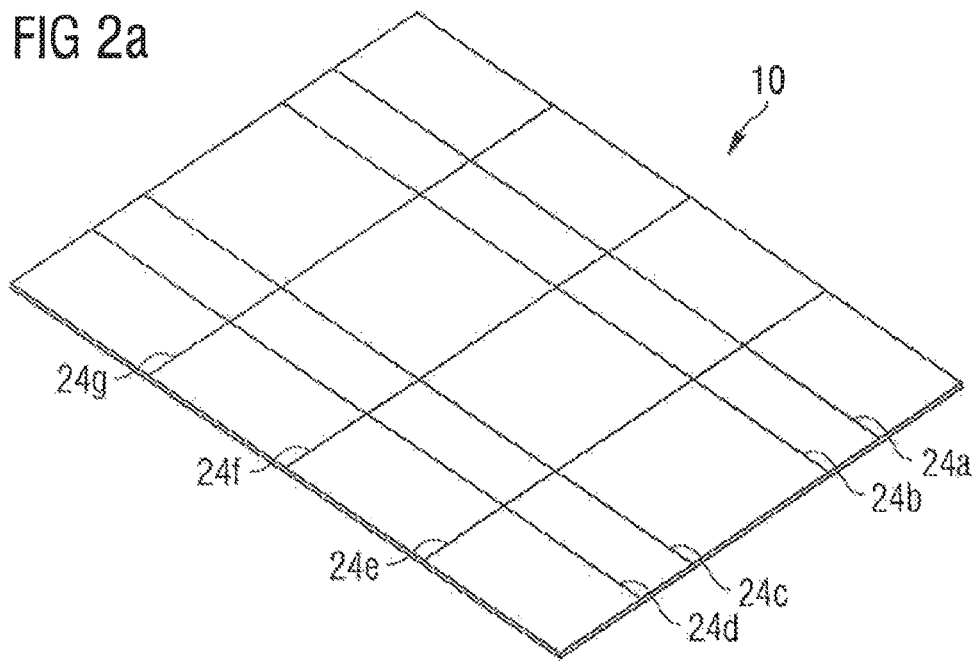
Figure 2B:
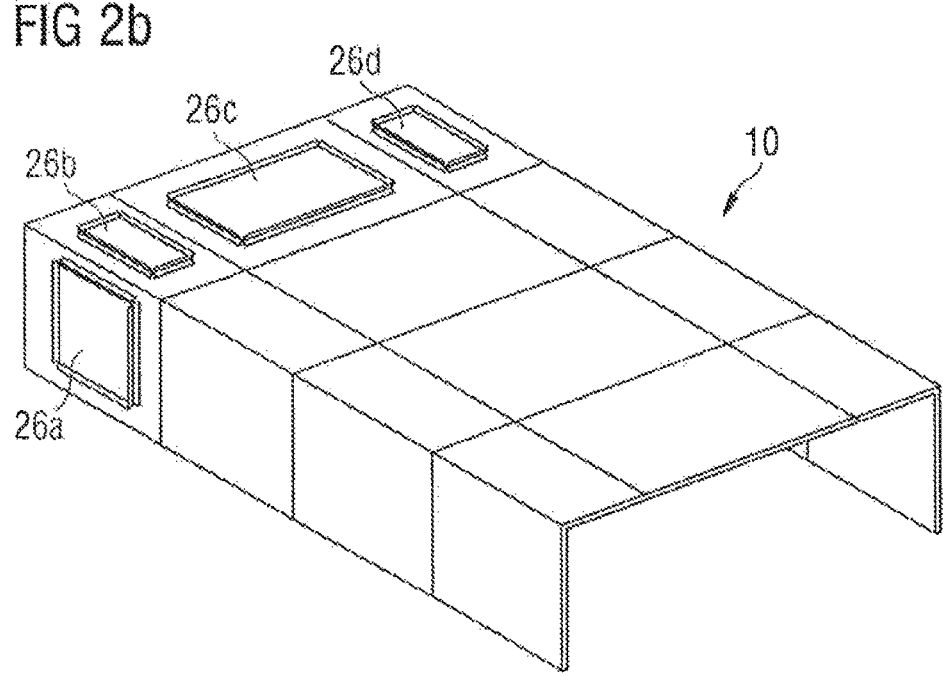
Figure 2E:
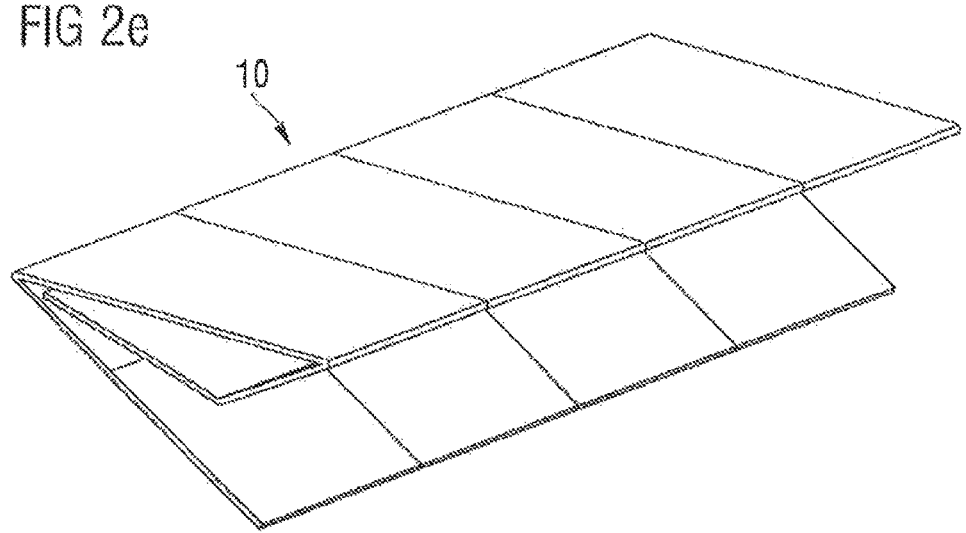

| | | | | |
|---|---|---|---|---|
| 5,007,473 | A | * | 4/1991 | Evensen ................. A47F 5/105 |
| | | | | 160/135 |
| 5,394,666 | A | * | 3/1995 | Zahner, III ................... 52/302.3 |
| 5,555,681 | A | * | 9/1996 | Cawthon ................. A01G 9/16 |
| | | | | 135/119 |
| 5,803,524 | A | * | 9/1998 | McCammon ............... 296/39.1 |
| 5,884,900 | A | * | 3/1999 | Gobeil et al. .................. 254/21 |
| 6,123,321 | A | * | 9/2000 | Miller ................. A47D 13/065 |
| | | | | 160/135 |
| 6,196,607 | B1 | * | 3/2001 | Gulisano ..................... 296/39.1 |
| 6,199,798 | B1 | * | 3/2001 | Stephan et al. ............ 244/129.4 |
| 7,350,772 | B2 | * | 4/2008 | Legrand .............. A47D 13/065 |
| | | | | 160/135 |
| 8,083,023 | B1 | * | 12/2011 | Perdue ................. E04B 1/8218 |
| | | | | 181/198 |
| 8,707,648 | B2 | * | 4/2014 | Timko et al. ................... 52/511 |
| 2004/0188563 | A1 | | 9/2004 | Guard |
| 2006/0249642 | A1 | * | 11/2006 | Mavis et al. .............. 248/346.3 |
| 2008/0066393 | A1 | * | 3/2008 | Sorensen ............. A63H 33/101 |
| | | | | 52/81.1 |
| 2008/0083376 | A1 | * | 4/2008 | Hurwitz .............. A01K 1/0125 |
| | | | | 119/167 |
| 2013/0092588 | A1 | * | 4/2013 | Aksan ................. B65D 81/261 |
| | | | | 206/503 |

FOREIGN PATENT DOCUMENTS

| | | |
|---|---|---|
| DE | 10 2007 009 499 | 8/2008 |
| DE | 10 2007 013 819 | 10/2008 |
| EP | 1 449 764 | 8/2004 |
| WO | WO 99/43390 | 9/1999 |

\* cited by examiner

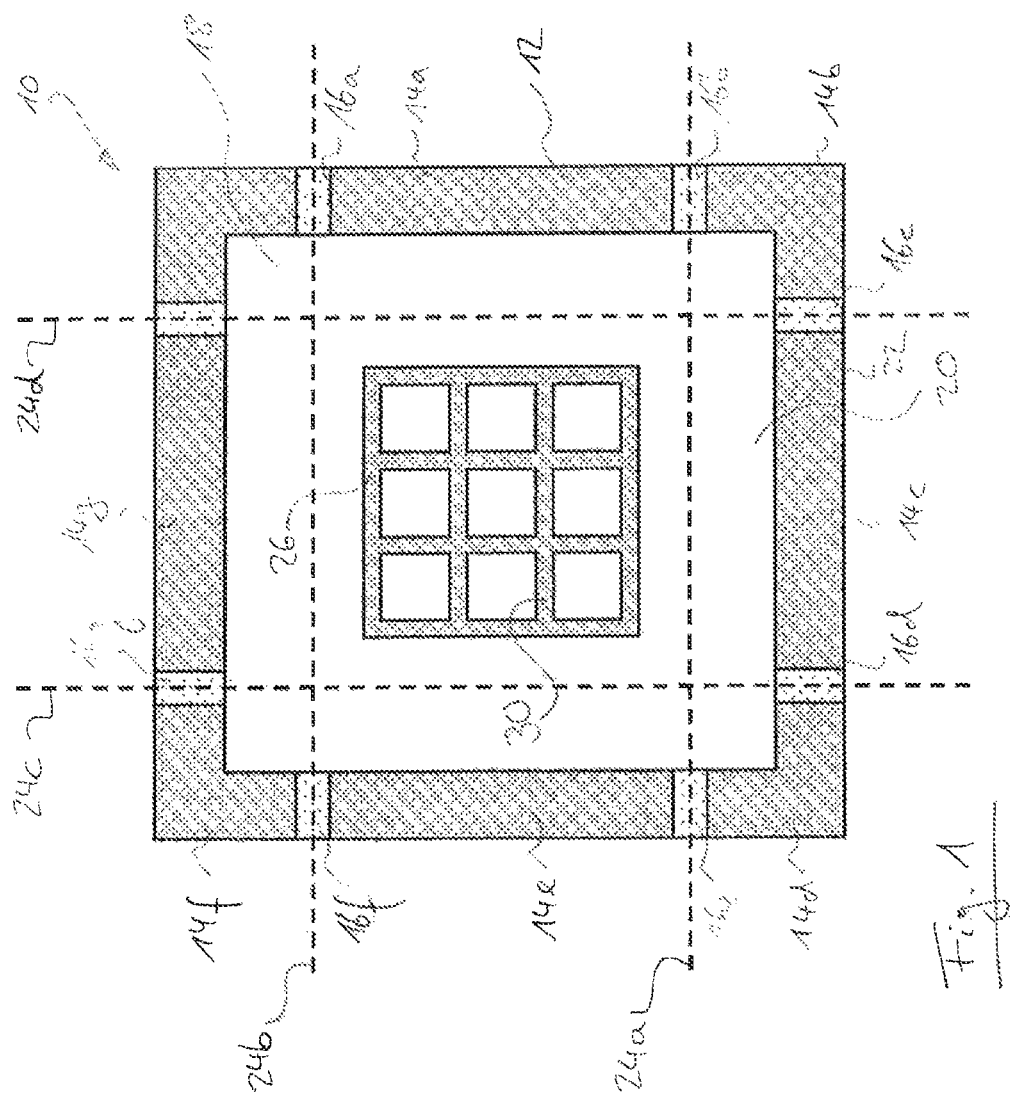

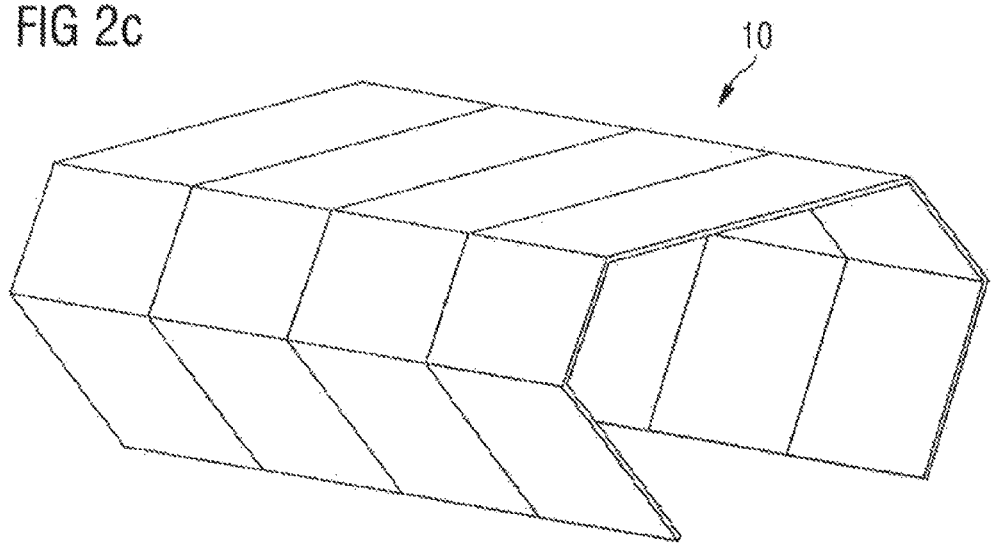
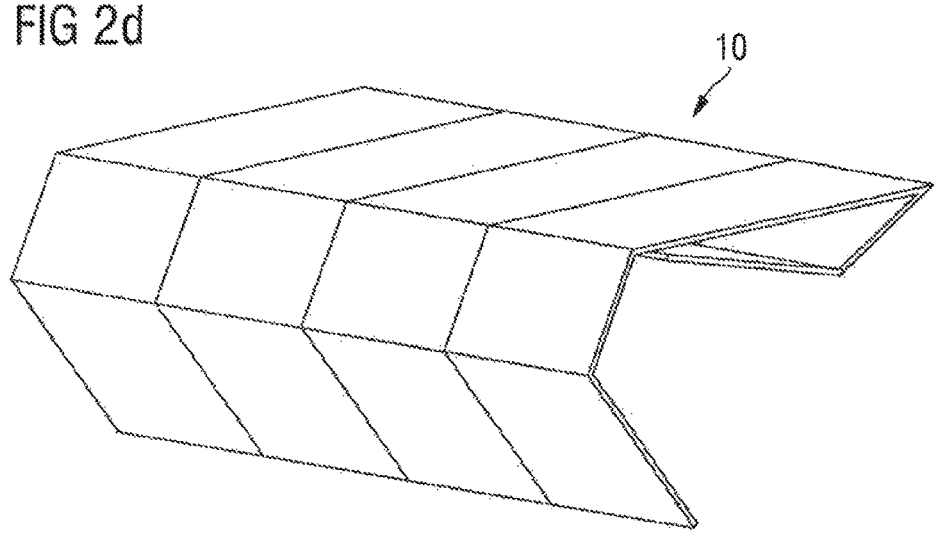

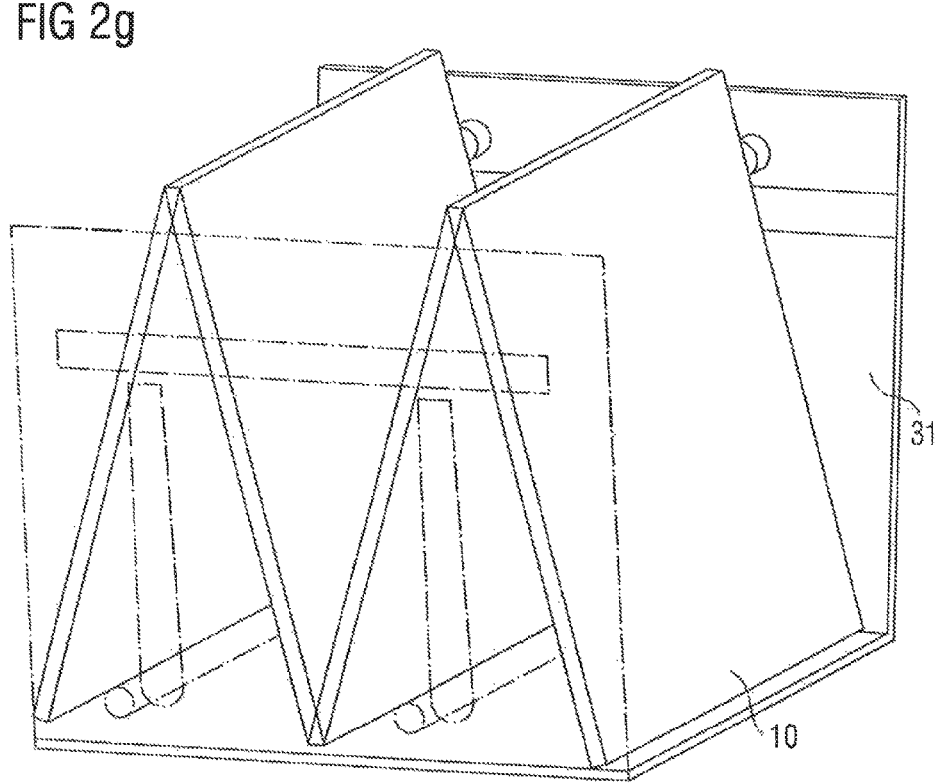

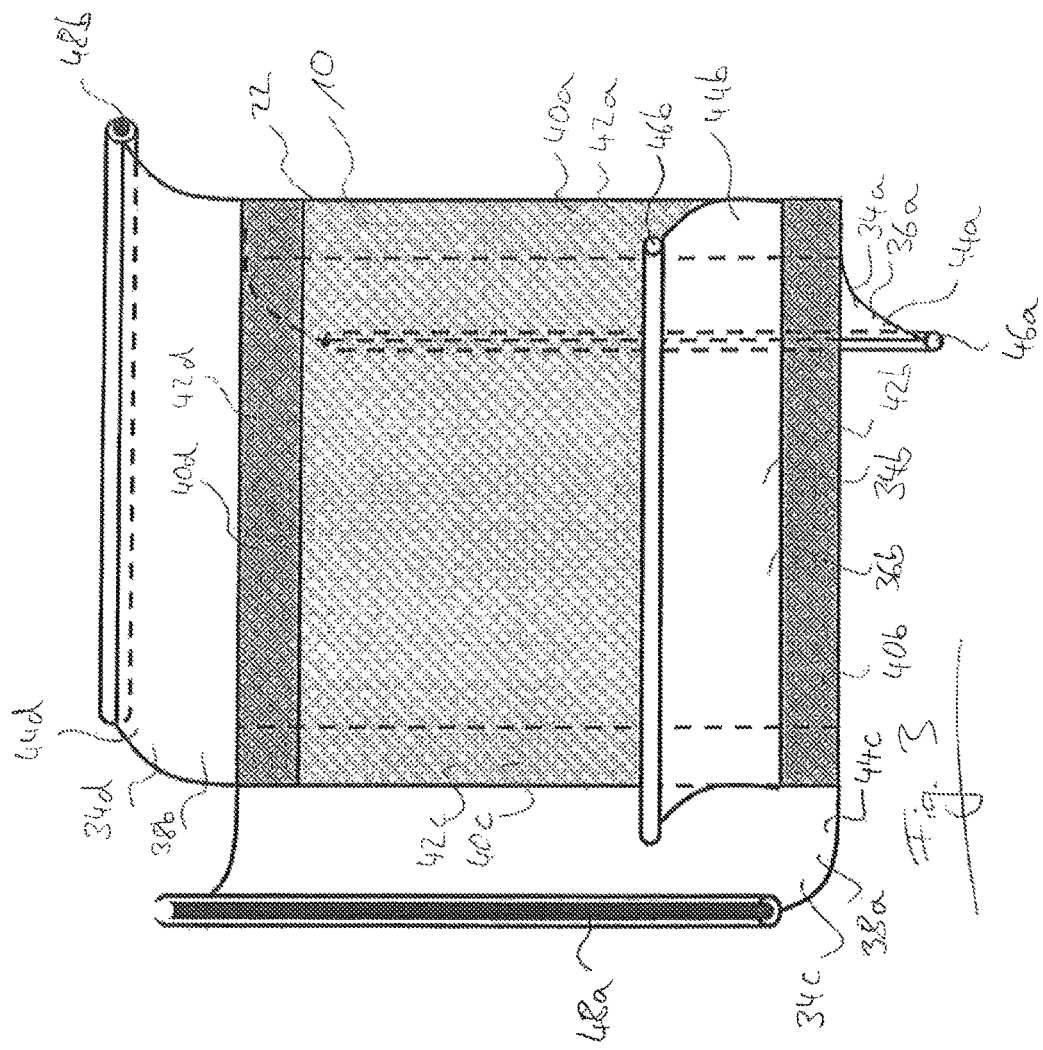

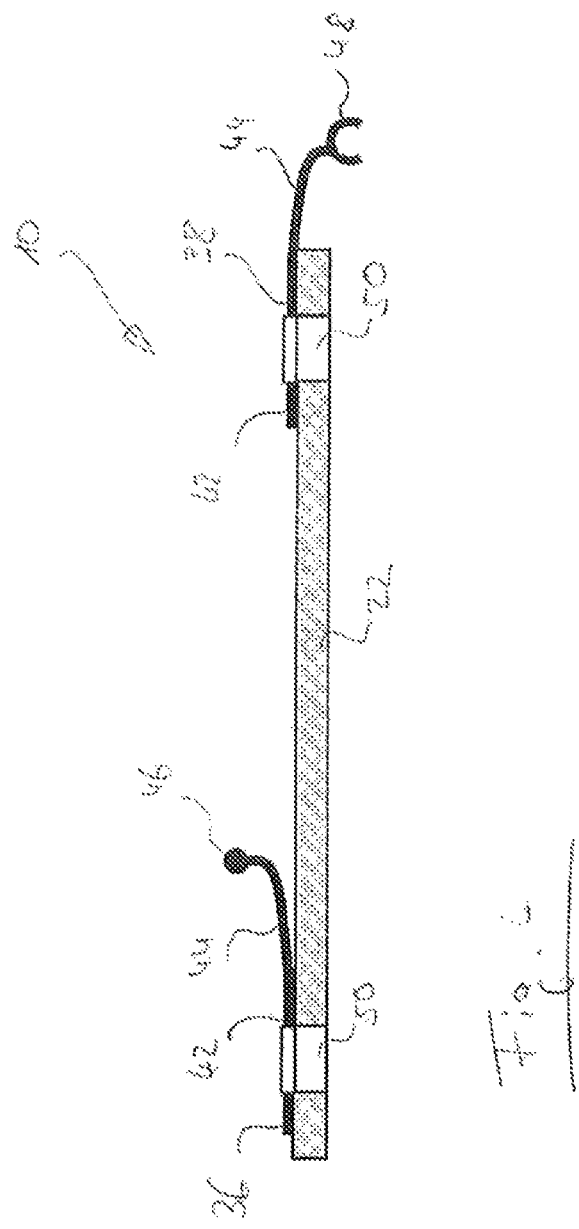

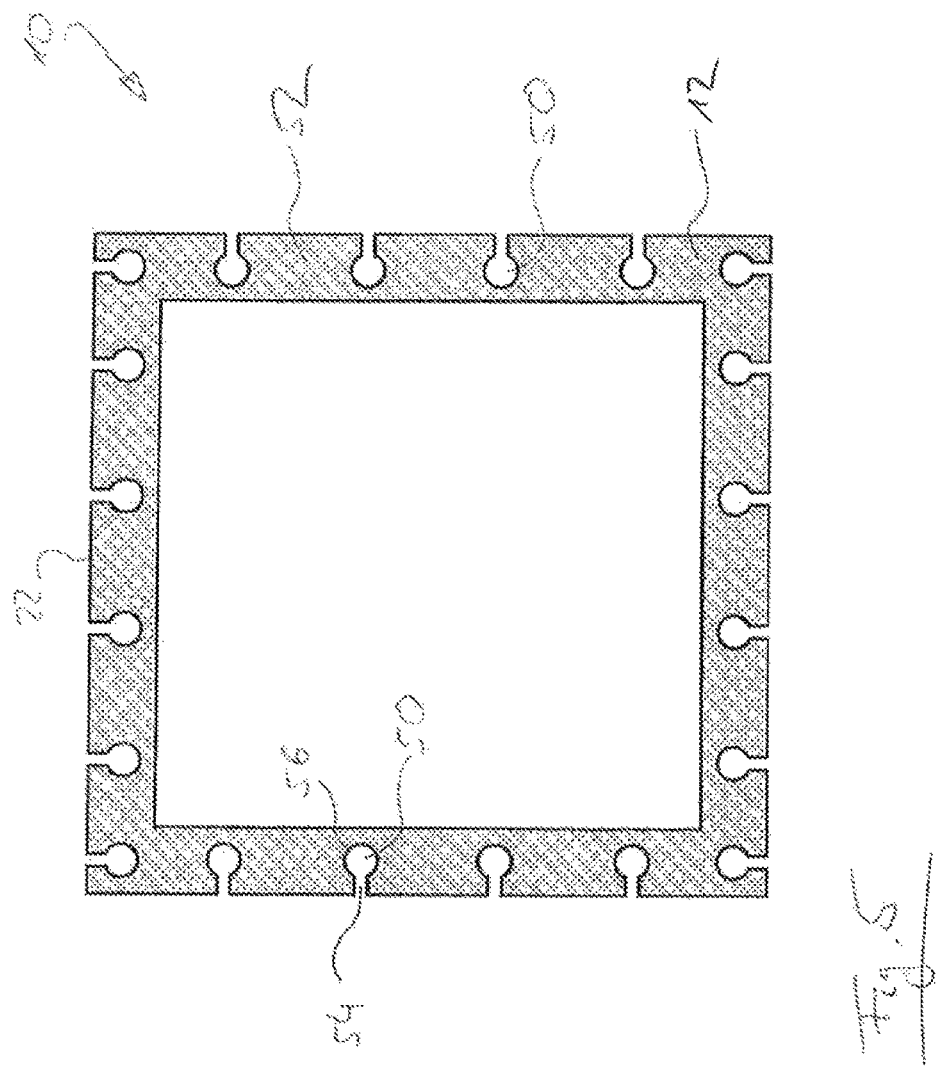

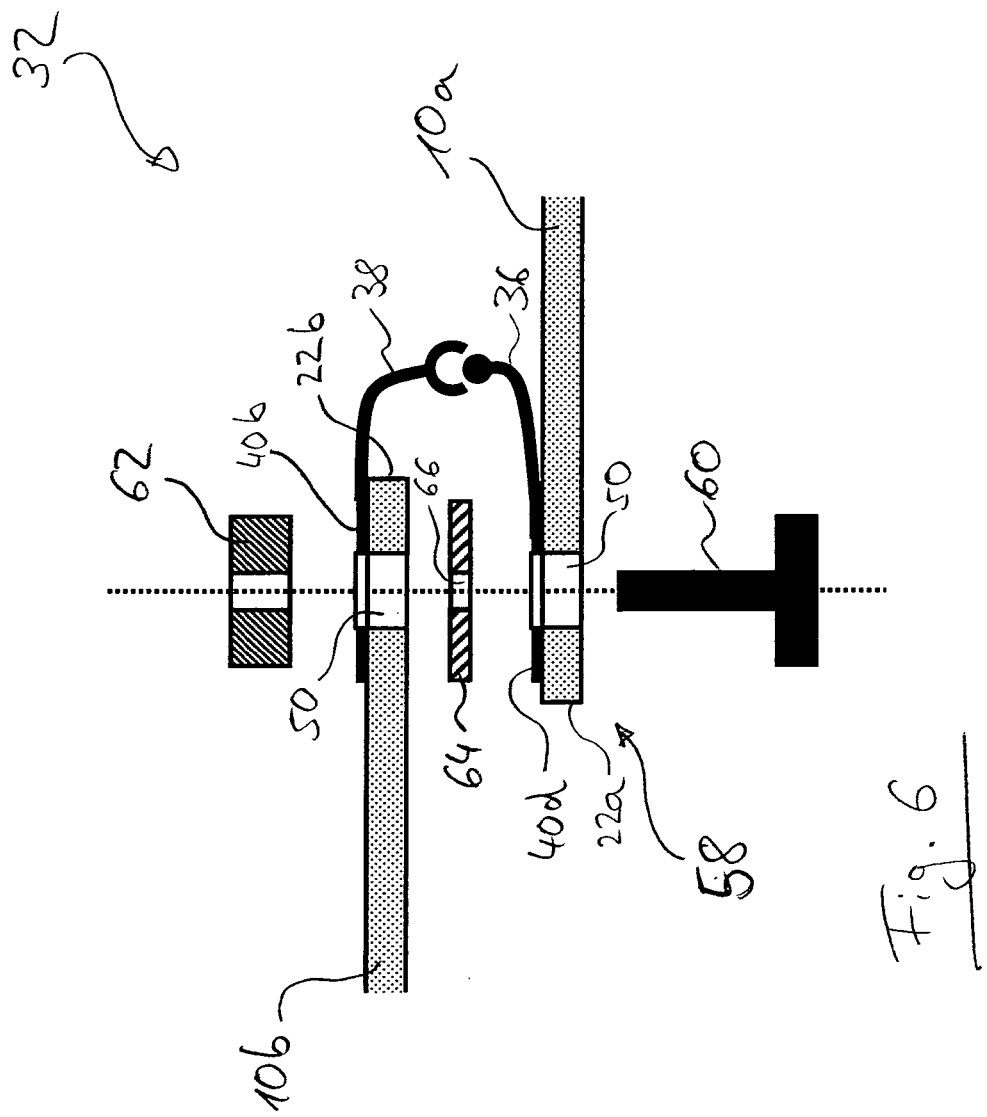

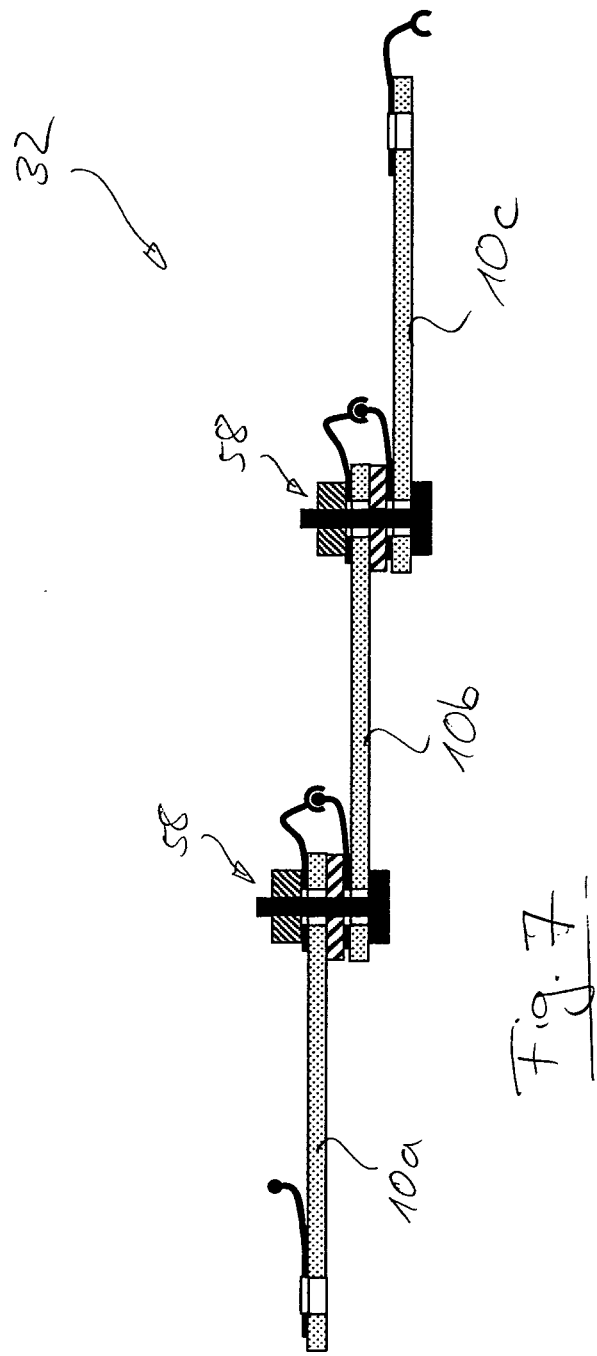

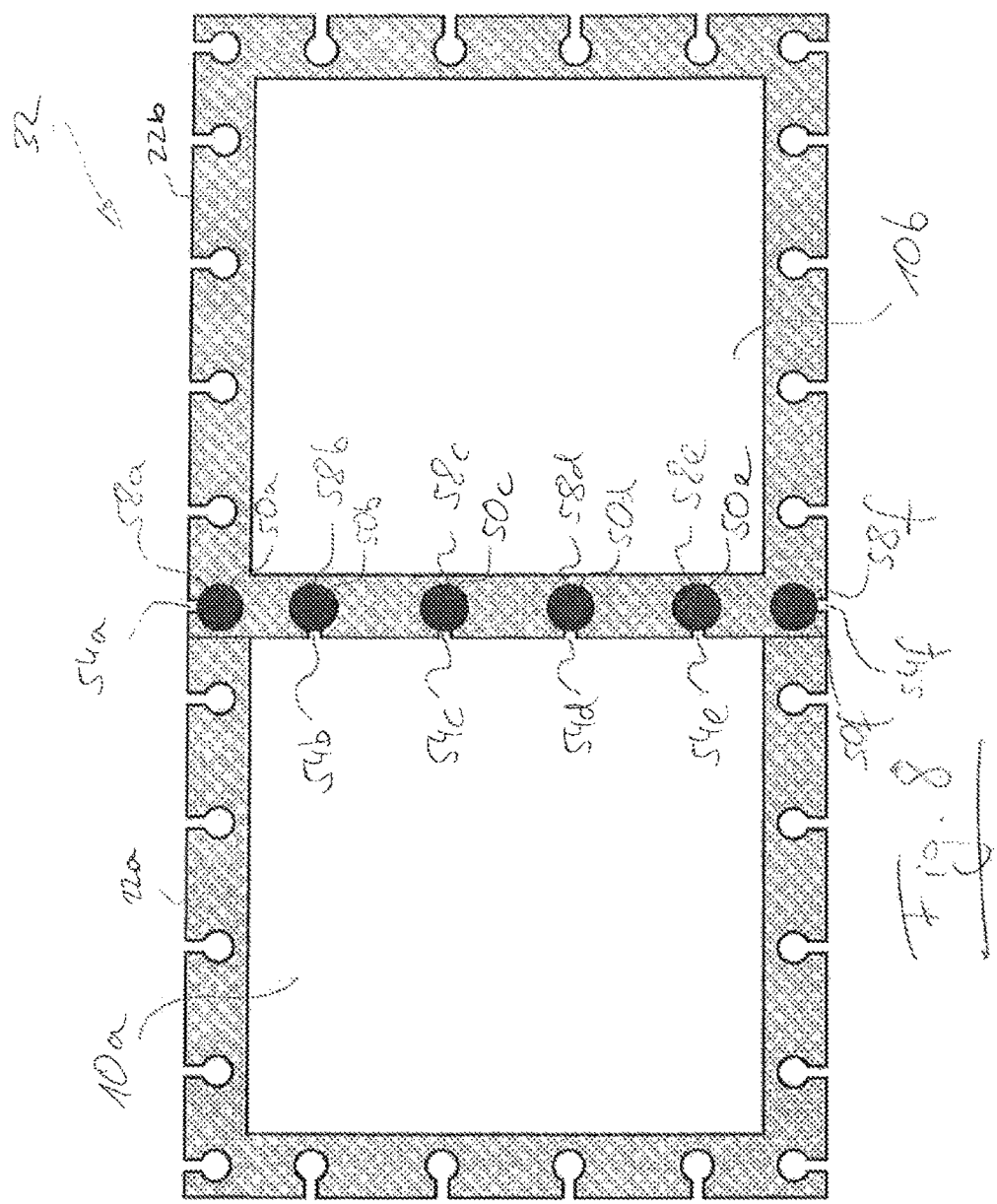

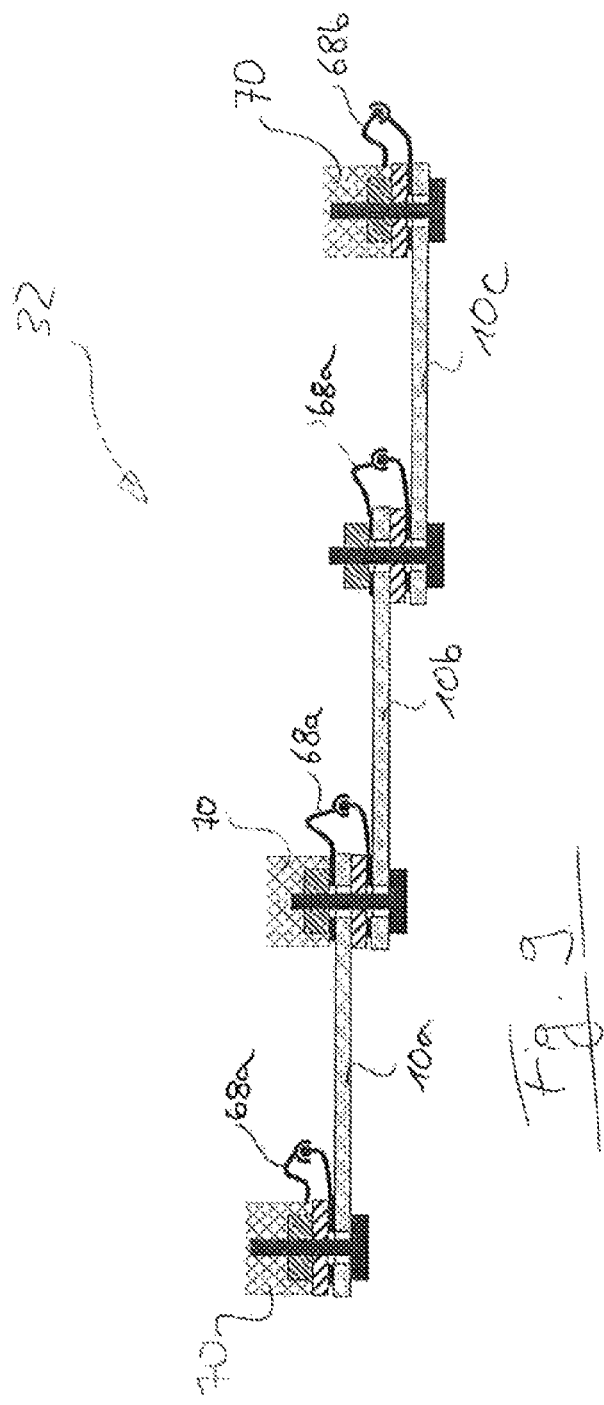

AIRCRAFT INTERIOR EQUIPMENT COMPONENT AND AIRCRAFT INTERIOR EQUIPMENT COMPONENT SYSTEM

This application is the U.S. national phase of International Application No. PCT/EP2011/001689, filed 5 Apr. 2011, which designated the U.S. and claims priority to German Application No. 10 2010 017 822.5, filed 20 Apr. 2010, and U.S. Provisional Application No. 61/325,880, filed 20 Apr. 2010, the entire contents of each of which are hereby incorporated by reference.

The present invention relates to an aircraft interior equipment component and to an aircraft interior equipment component system.

Elements which are currently used as aircraft interior equipment components comprise a basic structure which is usually designed as a rigid sandwich/honeycomb structure. The maximum dimensions of aircraft interior equipment components having a rigid basic structure are prescribed by the requirement of having to transport the components through the doors in the aircraft fuselage for assembly. The components, which are thus of comparatively small dimensions, are then installed individually in the interior of the aircraft fuselage.

An aircraft interior equipment component is known from DE 10 2007 013 819 A1 which comprises a supporting structure which is formed by a pressurisable chamber system. A membrane made from a drapable material is connected to the supporting structure. In the unpressurised state of the chamber system forming the supporting structure, the aircraft interior equipment component described in DE 10 2007 013 819 A1 can be "folded up" into a relatively small volume and transported through a door in the fuselage of an aircraft. Prior to assembly of the aircraft interior equipment component in its final assembly position in the aircraft fuselage, the chamber system which forms the supporting structure of the aircraft interior equipment component however first has to be acted upon by an internal pressure, by means of a compressor or the like, which is sufficient to impart the necessary structural load-bearing ability to the supporting structure of the aircraft interior equipment component.

Independently of the configuration of the basic structure of an aircraft interior equipment component, a further problem in the assembly of aircraft interior equipment components in an aircraft is that, at least in some regions of the aircraft, it is desirable or necessary to make interfaces between adjacent aircraft interior equipment components impermeable to gas. At the moment, this is done in a separate operating step by sealing off the interfaces with a suitable material, such as for example adhesive tape strips. This is time-consuming, labour-intensive and cost-intensive.

The present invention is directed to the object to provide an aircraft interior equipment component which can be installed in an aircraft simply and inexpensively. Further, the invention is directed to the object to provide an aircraft interior equipment component system which comprises a plurality of aircraft interior equipment components which are connected to one another in sealing manner and yet can be installed in an aircraft simply and inexpensively.

These objects are achieved by an aircraft interior equipment component having the features of claim 1 and by an aircraft interior equipment component system having the features of claim 11.

The aircraft interior equipment component according to the invention comprises a frame with two rigid frame sections and a joint connecting the two rigid frame sections to one another. Further, the aircraft interior equipment component comprises a sheetlike section which is supported by the frame and is formed by a flexible and/or foldable membrane connected to the frame. The rigid frame sections form a supporting structure which is non-flexible and/or non-foldable, at least in sections. The flexible and/or foldable membrane may for example be formed as a two-dimensional or three-dimensional, flat or curved, triangular, rectangular, square or parallelogram-shaped membrane surface. In combination with the flexible and/or foldable membrane and the joint which connects the two rigid frame sections, the aircraft interior equipment component thus has a semi-rigid basic structure.

The semi-rigid basic structure makes it possible to deform the aircraft interior equipment component, at least in sections. Thus the aircraft interior equipment component, for transportation to the assembly site at which the aircraft interior equipment component is installed in the aircraft which receives the aircraft interior equipment component, is deformed into a transportation state, the transportation state of the aircraft interior equipment component being distinguished from the state of the aircraft interior equipment component mounted in the aircraft by a reduced and/or more spatially compact dimension. The aircraft interior equipment component can thus be transported in a comfortable manner into its final assembly position in the aircraft and be installed there quickly and simply without further intermediate steps for preparing the aircraft interior equipment component for installation being necessary.

Preferably the aircraft interior equipment component comprises a plurality of joints which connect two rigid frame sections to one another, which joints are arranged on an imaginary fold line about which the aircraft interior equipment component can be bent and/or folded. The fold line runs within the aircraft interior equipment component preferably in such a manner that upon folding and/or bending of the aircraft interior equipment component about the fold line the spatial dimension of the aircraft interior equipment component along at least one direction in space is considerably reduced. The aircraft interior equipment component may also be bendable or foldable along a plurality of imaginary fold lines, the fold lines possibly intersecting each other, having any distances whatsoever from one another and/or being oriented relative to each other in any manner whatsoever.

The joint(s) is/are formed for example by cutouts in the frame, by non-reinforced, tapered, flexible and/or foldable sections of the frame, and/or by regions of the membrane which are formed in one piece with the sheetlike section which is supported by the frame. Each joint makes it possible for the two rigid frame sections which are connected to the joint to be able to be moved relative to one another. The joint therefore serves as a type of hinge, pivot and/or movement bearing between non-flexible, non-foldable, rigid and/or stiff parts of the aircraft interior equipment component. A joint may connect two, or more than two, rigid frame sections. Each rigid frame section may be connected by means of one joint or a plurality of joints to one or more other rigid frame section(s).

In a preferred embodiment of the aircraft interior equipment component, the frame extends along the outer periphery of the aircraft interior equipment component. For example, the frame can be formed by two-dimensional, tape-shaped strips which are connected to the membrane for example in an edge region of the membrane which forms the sheetlike section of the aircraft interior equipment component. In this embodiment, the frame fulfils the function of an edge reinforcement for the membrane. The frame may be connected to the membrane in punctiform manner, linearly and/or two-dimensionally.

Further, the aircraft interior equipment component preferably comprises a non-flexible and/or non-foldable reinforcement structure. For example, the reinforcement structure is connected to the membrane and extends over a partial surface of the sheetlike section which is supported by the frame. In such case, the reinforcement structure is preferably arranged on the membrane surface such that it is not intersected by the imaginary fold line(s) about which the aircraft interior equipment component can be bent and/or folded, and thus the bending ability and/or folding ability of the aircraft interior equipment component is not adversely affected. The combination of membrane and reinforcement structure can be utilised to configure the semi-rigid basic structure of the aircraft interior equipment component for transportation, assembly and/or intended purpose, depending on requirements. The reinforcement structure may be connected to the membrane in punctiform manner, linearly and/or two-dimensionally. In particular, the reinforcement structure may be in the form of a grid. The grid in such case preferably has a checkerboard pattern of grid struts which extend at right-angles and/or parallel to one another. The reinforcement structure in the form of a grid then forms a matrix structure on the membrane surface.

Preferably the frame, the frame sections, the joints, the membrane and/or the reinforcement structure consist(s) at least partially of a gas-impermeable, pollutant-impermeable, burn-through-resistant and/or flame-resistant material. In particular, the aircraft interior equipment component preferably withstands high temperatures without deforming thereunder and/or losing its structure. Thus the aircraft interior equipment component may serve as a gas-protection and/or fire-protection separating element between two interior regions of the aircraft, such as for example the cargo hold, passenger decks, galley and/or cockpit. In the event of smoke forming, pollutants escaping and/or an outbreak of fire in an interior region of the aircraft which is lined with the aircraft interior equipment component, the source of danger can be isolated and/or neutralised. Any spreading of the danger potential to other interior regions of the aircraft can therefore be reliably prevented.

Preferably the frame, the frame sections, the joints, the membrane and/or the reinforcement structure consist(s) at least partially of a thermoplastic material, such as for example polyphenyl sulfide, polyether sulfone and/or polyether ketone. These materials can be processed simply and comparatively inexpensively. Further, the use of thermoplastic materials makes it possible to weld the individual components of the aircraft interior equipment component together thermoplastically.

Preferably the frame, the frame sections, the joints, the membrane and/or the reinforcement structure consist(s) at least partially of a material reinforced with glass fibres, basalt fibres, aramid fibres and/or carbon fibres. In particular, the frame and/or the reinforcement structure may comprise what are called glass-fibre-reinforced unidirectional tapes. These tapes in such case are tape-shaped, two-dimensional fabric strips, with the fibres of the fabric extending parallel to the tape limiting edges. The tapes forming the frame or the reinforcement structure may be applied to the membrane and consolidated there, i.e. welded thermoplastically to the membrane by heat, pressure and/or ultrasound.

The aircraft interior equipment component system according to the invention comprises a first aircraft interior equipment component, to which a connecting element is fastened, and a second aircraft interior equipment component, to which a connecting element which is complementary to the connecting element of the first aircraft interior equipment component is fastened. The connecting element of the first aircraft interior equipment component and the connecting element of the second aircraft interior equipment component are adapted, upon connection of the first aircraft interior equipment component to the second aircraft interior equipment component, to engage with one another in order to form a connecting seam which is impermeable to gas. The connecting seam preferably extends along a connecting line between the first and the second interior equipment component. If the first and the second aircraft interior equipment component are for example formed to be rectangular, the connecting seam preferably extends over the entire length of one side of the first aircraft interior equipment component and over the entire length of a side of the second aircraft interior equipment component which adjoins the side of the first aircraft interior equipment component.

The aircraft interior equipment component system according to the invention comprises two aircraft interior equipment components which can be connected to one another in gastight manner by means of the connecting elements provided on the aircraft interior equipment components in a quick and simple manner. This means that costly operating steps for sealing off the interfaces between the aircraft interior equipment components of the aircraft interior equipment component system with adhesive tape or the like can be dispensed with, and the assembly of the aircraft interior equipment component system in an aircraft can be made easier overall.

In a preferred embodiment of the aircraft interior equipment component system, at least one further connecting element is fastened to the first aircraft interior equipment component, which further element is adapted, upon connection of the first aircraft interior equipment component to a further aircraft interior equipment component and/or an aircraft structure, to engage with a complementary connecting element of the further aircraft interior equipment component and/or the aircraft structure in order to form a connecting seam which is impermeable to gas. Alternatively or additionally to this, at least one further connecting element can be fastened to the second aircraft interior equipment component, which further element is adapted, upon connection of the second aircraft interior equipment component to a further aircraft interior equipment component and/or an aircraft structure, to engage with a complementary connecting element of the further aircraft interior equipment component and/or the aircraft structure in order to form a connecting seam which is impermeable to gas.

With such an aircraft interior equipment component system, interior regions of an aircraft can be lined over a large surface, without gaps and in a gas-impermeable manner with a panelling consisting of the aircraft interior equipment components. Further, the connecting elements on the aircraft interior equipment components and on the aircraft structure make it possible, in the event of pre-assembly of the components outside the aircraft or final assembly of the system in the aircraft, to connect the individual aircraft interior equipment components to one another and/or to the aircraft structure simply and without the use of separate sealing materials such as adhesive, adhesive tape and/or sealing foam. The installation of the aircraft interior equipment component system is thus inexpensive and also less time-consuming and labour-intensive.

The connecting element of the first aircraft interior equipment component may be formed as a tongue tab of a pressure closure strip or as a groove tab of a pressure closure strip. Further, the connecting element of the second aircraft interior equipment component may be designed as a tongue tab of a pressure closure strip or as a groove tab of a pressure closure strip. Preferably the connecting element of the first aircraft interior equipment component is embodied as a tongue tab and the connecting element of the second aircraft interior equipment component as a groove tab. Alternatively to this, the connecting element of the first aircraft interior equipment component may be embodied as a groove tab and the connecting element of the second aircraft interior equipment component as a tongue tab.

Further, a configuration in which the individual connecting elements are formed in sections as a groove tab and in sections as a tongue tab is conceivable. What is essential is merely that the connecting elements of the two aircraft interior equipment components can be connected to one another in gastight manner along their length. The configuration of the connecting elements as groove and tongue tabs of a pressure closure strip enables the connecting elements to be connected with one's bare hands without using an additional tool.

Preferably the connecting element(s) of the first aircraft interior equipment component extend(s) along at least a partial section of an outer periphery of the first aircraft interior equipment component. Further, the connecting element(s) of the second aircraft interior equipment component may extend along at least a partial section of an outer periphery of the second aircraft interior equipment component. This means that upon connecting two aircraft interior equipment components the two aircraft interior equipment components only overlap one another over a partial surface, if at all. This maximises the resulting overall surface of the overall module assembled from the two aircraft interior equipment components. The aircraft interior equipment component system thus permits space-saving and cost-saving lining of interior regions of aircraft.

If an aircraft interior equipment component of the aircraft interior equipment component system according to the invention for example has a rectangular or square shape, the connecting elements are preferably arranged along one or more lateral edges of the aircraft interior equipment component. In particular, one lateral edge of the aircraft interior equipment component may be equipped with a connecting element in the form of a tongue tab and the opposing lateral edge of the aircraft interior equipment component may be equipped with a connecting element in the form of a groove tab. The connecting elements may in each case be arranged both on a front side and on a rear side of the aircraft interior equipment component.

Preferably the first aircraft interior equipment component is penetrated by at least one bore which is arranged in an edge region of the first aircraft interior equipment component which adjoins the outer periphery of the first aircraft interior equipment component. A slot which reaches as far as the outer periphery of the first aircraft interior equipment component may extend from the bore. Alternatively or additionally to this, the second aircraft interior equipment component may also be penetrated by at least one bore which is arranged in an edge region of the second aircraft interior equipment component which adjoins the outer periphery of the second aircraft interior equipment component. Again, a slot which reaches as far as the outer periphery of the second aircraft interior equipment component may extend from the bore. For example, a plurality of bores may be arranged along an imaginary line parallel to a lateral edge of a rectangular or square aircraft interior equipment component. The cross-section of the bores may be circular, ellipsoidal, rectangular or otherwise formed.

One preferred embodiment of the aircraft interior equipment component system comprises a coupling device with a coupling pin, a coupling eye which is arranged to receive the coupling pin, and a sealing disc in which an opening which can be penetrated by the coupling pin is formed. The coupling eye can receive the coupling pin in a latching manner, so that the coupling pin cannot become inadvertently detached from the coupling eye. If the coupling pin is pushed through the sealing disc, the opening in the sealing disc and the coupling pin close off with each other in a gas-impermeable manner. The coupling device serves to connect together two aircraft interior equipment components. For this, the coupling pin is initially passed through a bore in a first aircraft interior equipment component, then through the sealing disc and then through a bore in a second aircraft interior equipment component, to be finally received securely by the coupling eye.

If a slot which extends from a bore as far as an outer periphery of the aircraft interior equipment component is formed in the first and/or the second aircraft interior equipment component, a movement of the aircraft interior equipment component may result in the aircraft interior equipment component becoming detached from the coupling pin. Such a movement of the aircraft interior equipment component may be triggered for example by a differential pressure acting on the aircraft interior equipment component in the event of decompression. It is then possible to dispense with the provision of additional decompression elements.

Preferably the connecting element(s) of the first aircraft interior equipment component and/or the connecting element(s) of the second aircraft interior equipment component consist(s) at least partially of a gas-impermeable material, of a flame-resistant material and/or of a burn-through-resistant material. This reliably prevents the passage of gases and/or liquids or penetration of fire through the connecting elements.

In particular, the connecting element(s) of the first aircraft interior equipment component and/or the connecting element(s) of the second aircraft interior equipment component may consist at least partially of a thermoplastic material, selected from a group comprising commercially available plastics material, polyphenyl sulfides, polyether sulfones and/or polyether ketones. Using such thermoplastic materials means that the connecting element(s) can be made elastically deformable, bendable and/or foldable. This further simplifies the installation of the aircraft interior equipment components in the aircraft, since the flexibility of the connecting element(s) makes possible simple connection of the connecting elements of two adjacent aircraft interior equipment components.

In a preferred embodiment of the aircraft interior equipment component system, the connecting element(s) of the first aircraft interior equipment component is/are attached to the first aircraft interior equipment component by thermoplastic welding. Further, the connecting element(s) of the second aircraft interior equipment component may be attached to the second aircraft interior equipment component by thermoplastic welding. The welding can be brought about by hot consolidation, pressure consolidation and/or ultrasonic consolidation. Alternatively to this, the connecting element(s) may however also be attached to the aircraft interior equipment component by gluing.

In a preferred embodiment of the aircraft interior equipment component system, the connecting element(s) of the first aircraft interior equipment component and/or the connecting element(s) of the second aircraft interior equipment component is/are coated with an intumescent paint. The intumescent paint is arranged to swell under the action of heat, and thus to bring about a burn-through-resistant seam between two connecting elements which are connected to one another. This means that the aircraft interior equipment components of the aircraft interior equipment component system remain connected both in a gas-impermeable manner and in a burn-through-resistant manner even under the action of heat.

The aircraft interior equipment components of the aircraft interior equipment component system according to the invention may be aircraft interior equipment components which are provided with a rigid basic structure, for example a sandwich/honeycomb structure. Preferably, however, at least one aircraft interior equipment component of the aircraft interior equipment component system according to the invention is configured as described above and has a frame with two rigid frame sections and a joint which connects the two rigid frame sections to one another, and also a sheetlike section which is supported by the frame, which section is formed by a flexible and/or foldable membrane which is connected to the frame. All the features described above in conjunction with such an aircraft interior equipment component can therefore be transferred to the aircraft interior equipment component system according to the invention.

Preferably the aircraft interior equipment component according to the invention and/or the aircraft interior equipment component system according to the invention are used in a cargo-hold region of a commercial aircraft. There, the aircraft interior equipment component and/or the aircraft interior equipment component system may be used for example as floor panelling, ceiling panelling or side-wall panelling.

Figure 10:
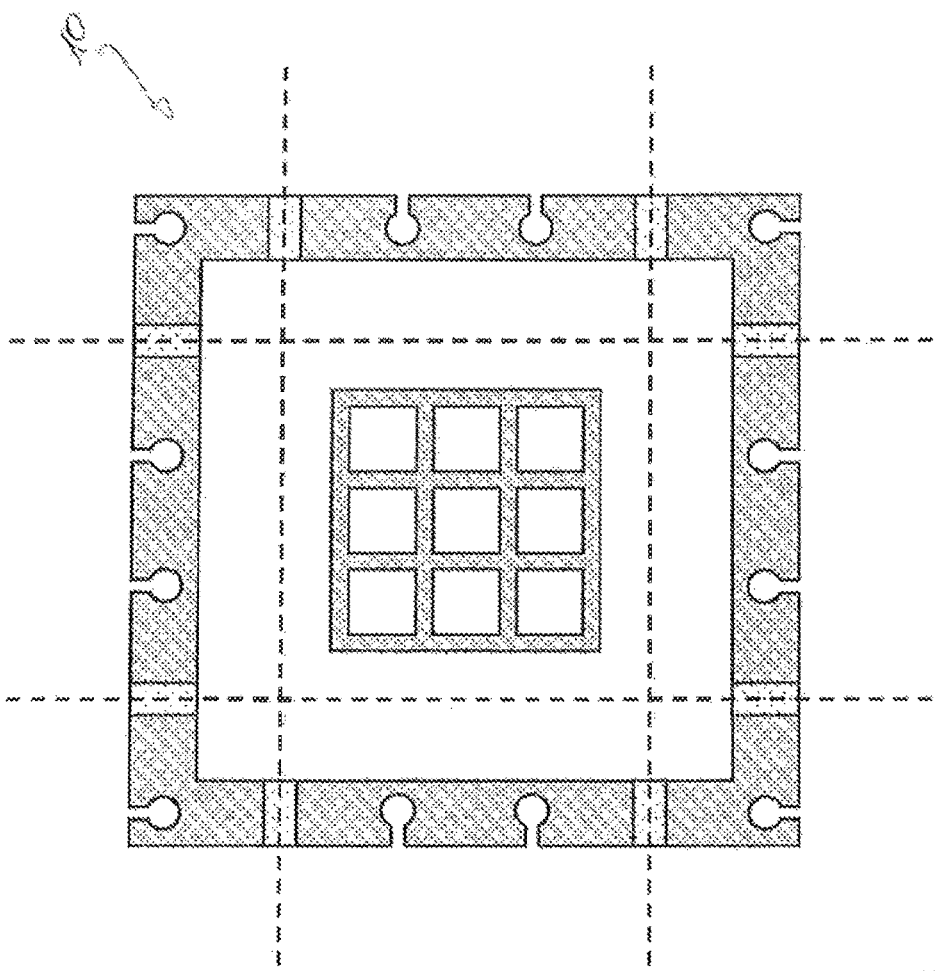

A preferred embodiment of the invention will now be explained in greater detail with reference to the appended diagrammatic figures. These show:

FIG. 1 a front view of an aircraft interior equipment component which can be folded along fold lines, FIGS. 2a to 2g different three-dimensional representations of an aircraft interior equipment component which comprises a plurality of fold lines and a plurality of reinforcement structures and is folded in steps along the fold lines, FIG. 3 a rear view of an aircraft interior equipment component which comprises a plurality of connecting elements, FIG. 4 a cross-sectional representation of the aircraft interior equipment component of FIG. 3, FIG. 5 a front view of the aircraft interior equipment component of FIG. 3, FIG. 6 a cross-sectional representation which illustrates the connection of two aircraft interior equipment components to form an aircraft interior equipment component system, FIG. 7 a cross-sectional representation of three aircraft interior equipment components of an aircraft interior equipment component system which are connected together, FIG. 8 a front view of two aircraft interior equipment components of an aircraft interior equipment component system which are connected together, FIG. 9 a cross-sectional representation of the aircraft interior equipment components of the aircraft interior equipment component system of FIG. 7 in a state fastened to an aircraft structure, FIG. 10 a front view of a further aircraft interior equipment component.

An aircraft interior equipment component 10 illustrated in FIG. 1 comprises a frame 12. The frame 12 comprises eight rigid frame sections 14a-h and eight joints 16a-h which connect the rigid frame sections to one another. Further, the aircraft interior equipment component 10 comprises a sheet-like section 18 which is supported by the frame and is formed by a flexible and/or foldable membrane 20 which is connected to the frame 12.

The membrane 20 consists of an S2 glass-fibre or basalt-fibre fabric which is impregnated with a thermoplastic material, such as polyphenol sulfide, polyether sulfone and/or polyether ketone. The membrane 20 is thus designed as a multi-layer laminate, and has the characteristic that it is bendable and/or foldable without problems. The membrane 20 has a two-dimensional, square, homogeneous and flat membrane surface. The aircraft interior equipment component 10 is defined by an outer periphery 22, the membrane surface extending as far as the outer periphery 22 of the aircraft interior equipment component 10.

The frame 12 consists of a material reinforced with glass fibres, basalt fibres, aramid fibres or carbon fibres. In particular, the frame 12 comprises unidirectional, tape-strip-shaped tapes, in which the individual fibres are arranged substantially parallel to the lateral tape edges. Further, the frame 12 contains a thermoplastic material, such as polyphenyl sulfide, polyether sulfone and/or polyether ketone. The rigid frame sections 14a-h of the frame 12 are formed to be non-flexible and/or non-foldable. The joints 16a-h, on the other hand, are formed by sections of the frame 12 which are flexible and/or foldable.

The frame 12 extends substantially continuously along the outer periphery 22 of the aircraft interior equipment component 10 and hence along the outer periphery of the membrane 20. The frame 12 is joined to the membrane 20 by thermoplastic welding. The frame 12 represents a type of edge reinforcement of the membrane 20. Along the frame 12, non-flexible and/or non-foldable rigid frame sections 14a-h alternate with the joints 16a-h. In such case, the joints 16a-h are arranged on four imaginary fold lines 24a-d. The fold lines 24a-d make it possible to bend and/or fold the frame 12 and the membrane 20, and hence the aircraft interior equipment component 10, in themselves about the fold lines 24a-d.

Furthermore, it can be inferred from FIG. 1 that the aircraft interior equipment component 10 comprises a reinforcement structure 26. The reinforcement structure 26 is connected to the membrane 20 and extends over a partial surface of the sheetlike section 18 which is supported by the frame 12. The reinforcement structure 26, similarly to the frame 12, consists of a material reinforced by glass fibres, basalt fibres, aramid fibres or carbon fibres, and/or of thermoplastic material, such as polyphenyl sulfide, polyether sulfone and/or polyether ketone. The reinforcement structure 26 is joined to the membrane 20 by thermoplastic welding. The reinforcement structure 26 is arranged on the membrane 20 in such a manner that the bending ability and/or folding ability of the aircraft interior equipment component 10 about the fold lines 24a-d is not adversely affected. This is achieved in that the reinforcement structure 26 is applied only to partial surfaces of the membrane 20 which are not intersected by the fold lines 24a-d.

The reinforcement structure 26 is in the form of a grid. It comprises grid struts 30 which contribute to the stiffness of the aircraft interior equipment component 10, and which are arranged in a checkerboard pattern. In this case, the grid struts 30, similarly to the frame 12, are formed from unidirectional tapes. The reinforcement structure 26 is aligned concentrically with the membrane 20. The grid struts 30 of the reinforcement structure 26 are oriented parallel or perpendicular to the edges of the outer periphery 22 of the aircraft interior equipment component 10.

As is illustrated in FIGS. 2a to 2g, an aircraft interior equipment component 10 configured as described above which differs from the component illustrated in FIG. 1 substantially merely by virtue of its geometry, can be folded up along the fold lines 24a-g in a few steps. This considerably reduces the original spatial extent of the aircraft interior equipment component 10. It is clear from FIG. 2b that the aircraft interior equipment component 10 illustrated in FIGS. 2a to 2g comprises a plurality of reinforcement structures 26a-d. For greater clarity, the illustration of the reinforcement structures 26a-d has been omitted from FIGS. 2a and 2c to g.

Figure 2F:
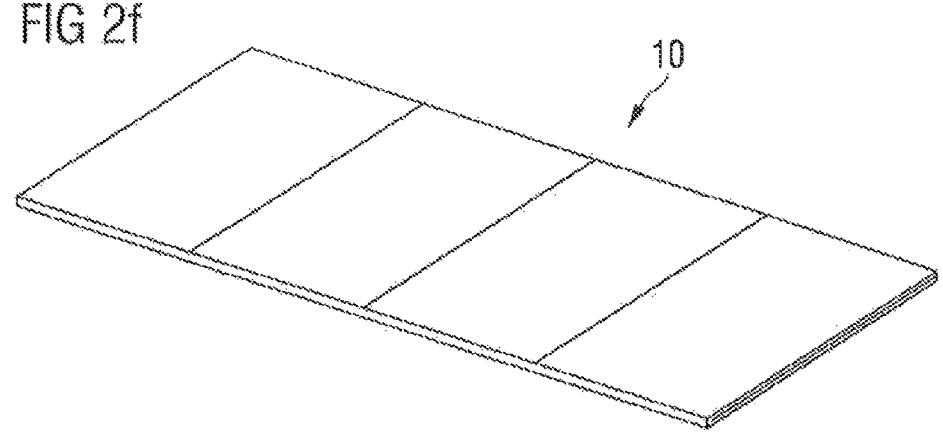

The aircraft interior equipment component 10 in the folding state illustrated in FIG. 2a has a surface extent which is four times greater than the folding state illustrated in FIG. 2f. Starting from the folding state shown in FIG. 2f, the aircraft interior equipment component 10 can be further folded for transportation. In FIG. 2g it is illustrated how the aircraft interior equipment component 10 is stowed folded-up in a transportation device 31. The aircraft interior equipment component 10 can thus be transported in space-saving manner to a location at which the aircraft interior equipment component 10 is mounted in an aircraft. In particular, the spatial dimensions of the aircraft interior equipment component 10 which is folded up for transportation is so small that the folded-up aircraft interior equipment component 10 upon assembly can be moved without problems through a door in an aircraft fuselage, such as a cargo-hold door. In the interior of the aircraft fuselage, the aircraft interior equipment component 10 is then unfolded again into its original state shown in FIG. 2a and is connected to the aircraft.

The use of thermoplastic materials for the individual components of the aircraft interior equipment component 10 makes it possible to make the aircraft interior equipment component 10 both impermeable to gas and burn-through-resistant, i.e. flame-resistant. Thus the aircraft interior equipment component 10 is suitable in particular for two-dimensionally lining an interior region of an aircraft which has a gas-isolating and/or fire-isolating action.

An aircraft interior equipment component 10 shown in FIGS. 3 to 5 can be connected to correspondingly configured aircraft interior equipment components 10 to form an aircraft interior equipment component system 32 (see FIG. 6). For this, the aircraft interior equipment component 10 comprises four connecting elements 34a-d, of which two are designed as male connecting elements 34a-b and two as female connecting elements 34c-d. Male connecting elements 34a-b and female connecting elements 34c-d are complementary to one another. If a male connecting element 34a-b engages with a female connecting element 34c-d, the connecting elements 34a-d latch into one another and form a connecting seam which is impermeable to gas. The male connecting element 34a-b is designed as a tongue tab 36a-b of a pressure closure strip and the female connecting element 34c-d is designed as a groove tab 38a-b of the pressure closure strip.

FIG. 3 shows how the two tongue tabs 36a-b and the two groove tabs 38a-b are arranged on the aircraft interior equipment component 10. A first tongue tab 36a extends along a partial section 40a of the outer periphery 22 of the aircraft interior equipment component 10 and is connected on a rear side of the aircraft interior equipment component 10 to the aircraft interior equipment component 10. A second tongue tab 36b extends along a partial section 40b of the outer periphery 22 and is connected on a front side to the aircraft interior equipment component 10. A first groove tab 38a extends along a partial section 40c of the outer periphery 22 and is connected on the rear side to the aircraft interior equipment component 10. A second groove tab 38b extends along a partial section 40d of the outer periphery 22 and is connected on the front side to the aircraft interior equipment component 10.

The tongue tabs 36a-b and groove tabs 38a-b are formed to be strip-shaped and are connected to the aircraft interior equipment component 10 in each case only via a partial surface 42a-d of the tongue and groove tabs 36a-b, 38a-b. The remaining non-connected partial surfaces 44a-d of the tongue and groove tabs 36a-b, 38a-b make it possible to mount the tongues 46a-b of the tongue tabs 36a-b and the grooves 48a-b of the groove tabs 38a-b in substantially movable manner. This simplifies the connection of the tongue tab 36 and groove tab 38 when assembling the aircraft interior equipment system 32.

The aircraft interior equipment component 10 further comprises a plurality of bores 50, see FIG. 5. The bores illustrated in FIG. 5 are not shown in the illustration of FIG. 3 for greater clarity. In the illustration of FIG. 5, on the other hand, the illustration of the connecting elements 34c-d has been dispensed with. The bores 50 extend through the aircraft interior equipment component 10 and are arranged in an edge region 52 of the aircraft interior equipment component 10 which adjoins the outer periphery 22 of the aircraft interior equipment component 10. Further, slots 54 are provided which extend from each bore 50 as far as the outer periphery 22 of the aircraft interior equipment component 10. The bore 50 has a circular cross-section 56. The width of the slot 54 is less than the diameter of the circular cross-section 56.

The aircraft interior equipment component system 32 which comprises at least two aircraft interior equipment components 10 according to FIGS. 3 and 5 further comprises an illustrated coupling device 58 (see FIG. 6), which is arranged to connect a first aircraft interior equipment component 10a to a second aircraft interior equipment component 10b of the aircraft interior equipment component system 32. The coupling device 58 comprises a coupling pin 60 and a coupling eye 62 which is arranged to receive the coupling pin 60 in latching manner. The coupling pin 60 and coupling eye 62 are designed as a standard plug-in connection of the type ABS 1010 and/or ABS 1011. The coupling device 58 further comprises a sealing disc 64 which is manufactured from a closed-cell silicone foam and in which an opening 66 which can be penetrated by the coupling pin 60 is formed. The opening 66 of the sealing disc 64 is configured such that the coupling pin 60 is received in a gas-impermeable manner upon extending through the sealing disc 64.

Upon connecting the first aircraft interior equipment component 10a to the second aircraft interior equipment component 10b, the coupling pin 60 is initially pushed through a partial section 40d of the outer periphery 22a of the first aircraft interior equipment component 10a which has a tongue tab 36 through one of the bores 50. Then the coupling pin 60 extends through the sealing disc 64 which lies two-dimensionally and in a gas-impermeable manner on the first aircraft interior equipment component 10a. Thereafter, the coupling pin 60 engages through one of the bores 50 in a partial section 40b of the outer periphery 22b of the second aircraft interior equipment component 10b which has a groove tab 38. In such case, the second aircraft interior equipment component 10b lies against the sealing disc 64. Finally, the coupling pin 60 engages in the coupling eye 62 which lies against the second aircraft interior equipment component 10b. The tongue tab 36 of the first aircraft interior equipment component 10a and the groove tab 38 of the second aircraft interior equipment component 10b are connected to one another and thus form a connecting seam which is impermeable to gas.

The coupling device 58 permits connection without problems of a plurality of aircraft interior equipment components 10a-c of the aircraft interior equipment component system 32, see FIGS. 7 and 8. As illustrated in FIG. 8, two aircraft interior equipment components 10a-b can be connected to one another in a gas-impermeable manner with the aid of a plurality of coupling devices 58a-f of the aircraft interior equipment component system 32. In FIG. 8, just as in FIG. 5, the illustration of the connecting elements 34c-d has been omitted.

A further advantage of the aircraft interior equipment component system 32 becomes clear from FIG. 8. Since slots 54a-f extending from the bores 50a-f as far as the outer periphery 22a-b of the aircraft interior equipment components 10a-b are formed in the aircraft interior equipment components 10a-c, a movement of an aircraft interior equipment component 10a-b may lead to the aircraft interior equipment component 10a-b becoming detached from the coupling pin. Such a movement of the aircraft interior equipment component 10a-b may be triggered for example by a differential pressure acting on the aircraft interior equipment component in the event of decompression. It is then possible to dispense with the provision of additional decompression elements.

The aircraft interior equipment component system 32 further comprises further connecting elements 68a-b which are fastened to an aircraft structure 70 of the aircraft receiving the aircraft interior equipment component system 32. FIG. 9 shows three aircraft interior equipment components 10a-c which are connected together and which are mounted on the aircraft structure 70. The connecting elements 68a-b which are fastened to the aircraft structure 70 in a gas-impermeable manner are designed as tongue tabs and/or groove tabs, and ensure a connection between the aircraft interior equipment components 10a-c and the aircraft structure 70 which is impermeable to gas.

FIG. 10 shows an aircraft interior equipment component 10 which has all the optional features of the aircraft interior equipment component 10 which are described here and is suitable for use in an aircraft interior equipment component system 32.

The invention claimed is:

1. An aircraft interior equipment component, comprising:
a frame which comprises at least two rigid frame sections and a hinged joint connecting the rigid frame sections to one another; and
a sheet-like section extending between the at least two rigid frame sections, the sheet-like section being supported by the frame and formed by a single flexible or foldable membrane connected to the frame;
a non-flexible or non-foldable reinforcement structure which extends over an interior surface of the sheet-like section;
wherein the hinged joint is arranged on a fold line traversing the frame and the sheet-like section, about which fold line the aircraft interior equipment component, including the sheet-like section, can be bent or folded about the fold line.

2. The aircraft interior equipment component according to claim 1, wherein the aircraft interior equipment component comprises a plurality of hinged joints which connect two frame sections to one another, which hinged joints are arranged on an imaginary fold line about which the aircraft interior equipment component can be bent or folded.

3. The aircraft interior equipment component according to claim 1, wherein the hinged joints are formed by cutouts in the frame, by non-reinforced, flexible or foldable sections of the frame, or by regions of the membrane which are formed in one piece with the sheetlike section which is supported by the frame.

4. The aircraft interior equipment component according to claim 1, wherein the frame extends substantially continuously along the outer periphery of the aircraft interior equipment component.

5. The aircraft interior equipment component according to claim 1, wherein the frame, the hinged joint, the membrane or a reinforcement structure comprises a gas-impermeable material or a burn-through-resistant material.

6. The aircraft interior equipment component according to claim 1, wherein the frame, the hinged joint, the membrane or a reinforcement structure comprises a thermoplastic material selected from a group comprising polyphenyl sulfides, polyether sulfones or polyether ketones.

7. The aircraft interior equipment component according to claim 1, wherein the frame, the hinged joint, the membrane or a reinforcement structure comprises a material reinforced with glass fibres, basalt fibres, aramid fibres or carbon fibres.

8. The aircraft interior equipment component according to claim 1, wherein the frame or a reinforcement structure is connected to the membrane by a thermoplastic weld.

9. The aircraft interior equipment component according to claim 1, wherein a reinforcement structure is in the form of a grid.

10. An aircraft interior equipment component system with:
a first aircraft interior equipment component which is directly fastened to a flexible first connecting element sheet,
a second aircraft interior equipment component which is directly fastened to a flexible second connecting element sheet, wherein the second connecting element sheet is separate from and complementary to the first connecting element, and
a coupling device configured to join the first aircraft interior component to the second aircraft interior component, wherein the coupling device is a separate component to the first and second connecting elements,
wherein the first connecting element and the second connecting element are adapted, upon connection of the first aircraft interior equipment component to the second aircraft interior equipment component, to engage with one another to form a connecting seam which is impermeable to gas.

11. The aircraft interior equipment component system according to claim 10, wherein at least one further connecting element is fastened to the first aircraft interior equipment component, which further connecting element is adapted, upon connection of the first aircraft interior equipment component to a further aircraft interior equipment component or an aircraft structure, to engage with a complementary connecting element of the further aircraft interior equipment component or the aircraft structure in order to form a connecting seam which is impermeable to gas, or in that at least one further connecting element is fastened to the second aircraft interior equipment component, which further connecting element is adapted, upon connection of the second aircraft interior equipment component to a further aircraft interior equipment component or an aircraft structure, to engage with a complementary connecting element of the further aircraft interior equipment component or the aircraft structure in order to form a connecting seam which is impermeable to gas.

12. The aircraft interior equipment component system according to claim 10, wherein the first connecting element of the first aircraft interior equipment component or the second connecting element of the second aircraft interior equipment component is formed as a tongue tab of a pressure closure strip or as a groove tab of a pressure closure strip.

13. The aircraft interior equipment component system according to claim 10, wherein the first connecting element of the first aircraft interior equipment component extends along at least a partial section of an outer periphery of the first aircraft interior equipment component or in that the second connecting element of the second aircraft interior equipment component extends along at least a partial section of an outer periphery of the second aircraft interior equipment component.

14. The aircraft interior equipment component system according to claim 10, wherein the first aircraft interior equipment component is penetrated by at least one bore which is arranged in an edge region of the first aircraft interior equipment component which adjoins the outer periphery of the first aircraft interior equipment component, with a slot which reaches as far as the outer periphery of the first aircraft interior equipment component extending from the bore, or in that the second aircraft interior equipment component is penetrated by at least one bore which is arranged in an edge region of the second aircraft interior equipment component which adjoins the outer periphery of the second aircraft interior equipment component, with a slot which reaches as far as the outer periphery of the second aircraft interior equipment component extending from the bore.

15. The aircraft interior equipment component system according to claim 10, wherein the coupling device comprises:
a coupling pin,
a coupling eye which is arranged to receive the coupling pin, and
a sealing disc, in which an opening which can be penetrated by the coupling pin is formed.

16. The aircraft interior equipment component system according to claim 10, wherein the first connecting element of the first aircraft interior equipment component or the second connecting element of the second aircraft interior equipment component each comprise a gas-impermeable material or of a burn-through-resistant material.

17. The aircraft interior equipment component system according to claim 10, wherein the first connecting element of the first aircraft interior equipment component or the second connecting element of the second aircraft interior equipment component comprises a thermoplastic material, selected from a group comprising polyphenyl sulfides, polyether sulfones or polyether ketones.

18. The aircraft interior equipment component system according to claim 10, wherein the first connecting element of the first aircraft interior equipment component is attached to the first aircraft interior equipment component by thermoplastic welding or in that the second connecting element of the second aircraft interior equipment component is attached to the second aircraft interior equipment component by thermoplastic welding.

19. The aircraft interior equipment component system according to claim 10, wherein the first connecting element of the first aircraft interior equipment component or the second connecting element of the second aircraft interior equipment component is coated with an intumescent paint.

20. The aircraft interior equipment component system according to claim 10, wherein the first aircraft interior equipment component or the second aircraft interior equipment component is an aircraft interior equipment component comprising:
a frame which comprises two rigid frame sections and a joint connecting the rigid frame sections to one another, and
a sheet-like section which is supported by the frame and is formed by a flexible or foldable membrane connected to the frame.

21. Use of the aircraft interior equipment component according to claim 1 as a paneling element in a cargo-hold region of a commercial aircraft.

22. An aircraft interior equipment component system with:
a first aircraft interior equipment component, the first aircraft interior equipment component comprising a first connection bore and a first flexible connecting element projecting from the first aircraft interior equipment component;
a second aircraft interior equipment component, the second aircraft interior equipment component comprising a second connection bore and a second flexible connecting element projecting from the second aircraft interior equipment component;
a sealing disc; and
a coupling system configured to pass through the first connection bore, the sealing disc, and the second connection bore, in order, and create a first gas-impermeable connection when installed;
wherein:
the first flexible connecting element and second flexible element are complementary and form a second gas-impermeable connection when connected;
the second gas-impermeable connection comprises a seam which is configured to extend a length of an associated edge of an associated aircraft interior equipment component; and
the first aircraft interior equipment component and the second aircraft interior equipment component each comprises:
a frame which comprises a plurality of rigid frame sections and a hinged joint connecting the rigid frame sections to one another, and
a sheet-like section which is supported by the frame and is formed by a flexible or foldable membrane connected to the frame;
further wherein the hinged joint is configured to maintain a gas impermeable barrier.

23. An assembly of panels of an aircraft interior component comprising:
aircraft interior rigid panels formed of a rigid material and each panel including a first edge and a second edge opposite to the first edge of the panel;
each aircraft interior rigid panel includes a first flexible sheet having a fastened sheet edge region fastened to a first surface of the rigid panel proximate to the first edge of the panel and a free sheet edge opposite to the fastened sheet edge region, wherein the free sheet edge is parallel to the first edge of the rigid panel and includes a groove, and wherein the first flexible sheet has a width extending an entire length between the first and second opposite edges of the rigid panel and extends lengthwise in a first direction from the fastened sheet edge region to the free sheet edge of the first flexible sheet;

each aircraft rigid panel includes a second flexible sheet having a fastened sheet edge region fastened to a first surface of the rigid panel proximate to the second edge of the panel and a free sheet edge opposite to the fastened sheet edge region, wherein the free sheet edge is parallel to the second edge of the rigid panel and includes a tongue tab configured to attach to the groove of the first flexible sheet of an adjacent one of the aircraft interior rigid panels, and wherein the second flexible sheet has a width extending an entire length between the first and second opposite edges of the rigid panel and extends lengthwise in the first direction from the fastened sheet edge region to the free sheet edge of the second flexible sheet;

each aircraft interior rigid panel includes openings proximate to the first edge and the second edge, and removable coupling devices each extend through one of the openings proximate to the first edge of one of the aircraft interior rigid panels and through one of the openings proximate to the second edge of the adjacent rigid frame panel, wherein the assembly of panels is foldable while the coupling devices are not extending through the openings and the panels are connected by the first and second flexible sheets, and wherein the assembly of panels is rigid while the panels are connected together by the coupling devices each extend through the openings.

24. The panel as in claim 23 further comprising:

a third edge and a fourth edge each extended between the first and second edges, and each aircraft interior rigid panel includes a third flexible sheet having a fastened sheet edge region fastened to a second surface, opposite to the first surface, of the rigid panel and proximate to the third edge of the panel and a free sheet edge opposite to the fastened sheet edge region, wherein the free sheet edge is parallel to the third edge of the rigid panel and includes a groove, and wherein the third flexible sheet extends in a second direction, perpendicular to the first direction, from the fastened sheet edge region to the free sheet edge of the third flexible sheet, and each aircraft interior rigid panel includes a fourth flexible sheet having a fastened sheet edge region fastened to the second surface of the rigid panel and proximate to the fourth edge of the panel and a free sheet edge opposite to the fastened sheet edge region, wherein the free sheet edge is parallel to the fourth edge of the rigid panel and includes a tongue tab configured to fasten to the groove of the third flexible sheet of an adjacent one of the rigid panels, and wherein the fourth flexible sheet extends in the second direction, from the fastened sheet edge region to the free sheet edge of the fourth flexible sheet.

25. The aircraft interior equipment component according to claim 1, wherein the reinforcement structure is arranged on the sheet-like section such that a folding ability of the aircraft interior equipment component about the fold lines is not affected.

* * * * *